Jan. 16, 1934.    F. SHENTON    1,944,113
SOLENOID SHUT-OFF VALVE
Filed April 2, 1932
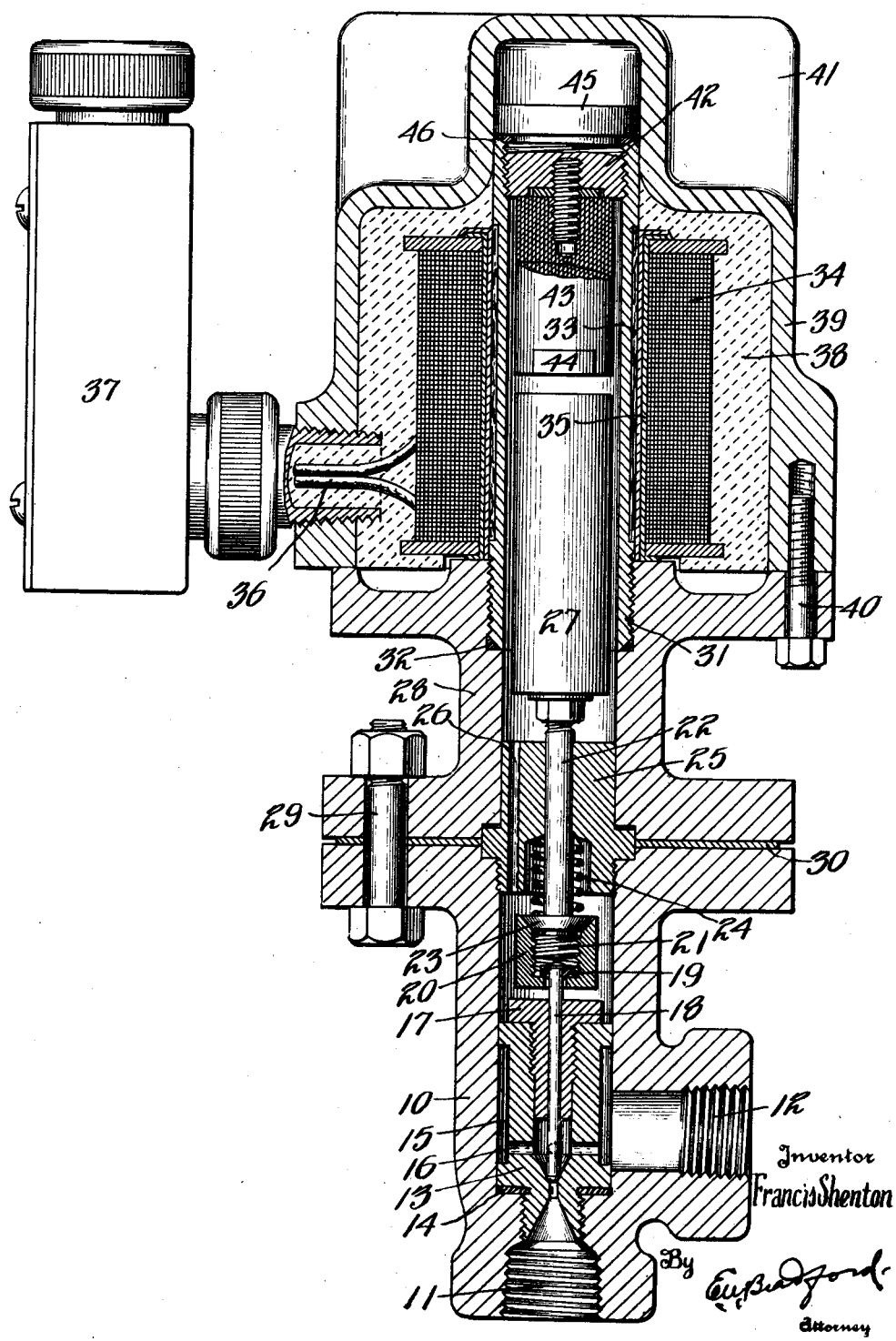
Inventor
Francis Shenton Patented Jan. 16, 1934

1,944,113

UNITED STATES PATENT OFFICE 1,944,113

SOLENOID SHUT-OFF VALVE

Francis Shenton, Waynesboro, Pa., assignor to Frick Company, Waynesboro, Pa., a corporation of Pennsylvania Application April 2, 1932. Serial No. 602,823

3 Claims. (Cl. 137—139)

This invention relates to solenoid operated valves and its object is to provide a valve having several parts or groups of parts, so constructed as to insure operation even though not in exact alignment one with the other.

A further object is to provide means for sealing certain parts from contact by injurious gases.

A still further object is to provide a valve having a lining of non-tarnishable material.

A still further object is to provide a solenoid operated valve in which the coil may be replaced without breaking the seal in the fluid circuits.

Referring to the accompanying drawing which is made a part hereof and on which similar reference characters indicate similar parts, The single figure of the drawing is a vertical section of a valve showing my invention applied thereto.

In the drawing numeral 10 indicates the body of the valve which is provided with an inlet 12 and an outlet 11 for fluid passing therethrough. The valve body 10 is provided with a removable valve seat 13 which is screwed down against a gasket 14 to make a fluid tight contact with the valve body. The valve seat is machined to provide an annular clearance at 15 and is provided with radial bores 16 to provide ports for the passage of gas or liquid from the passage 12 to the passage 11, or from the passage 11 to the passage 12 depending on the direction of flow through these passages. A guide plug 17 having a bore for receiving a valve stem 18 is threaded into the valve seat 13. The plug 17 serves as a perfect centering device to guide the valve stem 18 to its tapered seat as indicated. Valve stem 18 is provided with a head 19 which is held within a chamber formed between the head end of a special nut 20 and a screw threaded portion 21 of a plunger rod 22. The plunger rod 22 is provided with a tapered shoulder portion 23 which seats on the nut 20 and against which seats the end of a compression spring 24. The other end of the spring seats in a socket in the lower end of a guide plug 25. The lower end of the plug 25 is screw threaded in the bore of the valve body 10. The head 19 of the valve stem 18 is loosely positioned within the nut 20 so that the valve stem may seat accurately on the valve seat even though the plunger rod 22 and the valve stem 18 are not in perfect axial alignment.

The plunger rod guide 25 is provided with a bore 26 for venting the chamber above this guide to permit free actuation of the valve. The upper end of the plunger rod 22 is secured to an armature 27. The plunger rod guide 25 is machined to fit neatly within a fill piece 28 which is secured to the valve body 10 by means of bolts 29, a suitable gasket 30 providing against the leakage of fluid between the parts. The armature is positioned within and spaced from a plunger tube 31 which is preferably threaded into an enlarged bore in the upper end of the fill piece 28. A suitable gasket 32 provides a seat for the plunger tube to insure a perfect seal against the leakage of fluid. An asbestos jacket 33 is positioned about the plunger tube 31. A coil 34 is wound about a supporting core 35. Suitable lead-in wires 36 connect the opposite ends of the coil with a source of current housed in an outlet box 37. Suitable moisture proof compound 38 is placed about the coil. The coil together with its encasing moisture proof material are enclosed in a housing 39 which housing is secured by bolts 40 to a flange on the upper side of the fill piece 28. In order to assist in dissipation of heat from the parts, the housing 39 is provided with radiating fins 41. By sealing the coil in the housing 39 these parts may be manipulated as a single unit.

In the upper end of the plunger tube 31 is threaded a plug 42 to which is secured a stationary plunger 43. In the lower end of the stationary plunger is embedded a shading coil 44 of known construction. A suitable gasket 46 provides a seat for the plug 45 to insure a perfect seal against leakage of fluid.

Electrical current to the coil may be controlled manually or may be by a thermostat, float switch, time switch or any other device used to make and break an electric current. The plunger tube 31 is constructed of non-magnetic material which is not affected injuriously by most acid fluids such as commonly used in refrigerating machines. This insures a long life for the sleeve.

All of the parts are hermetically sealed within the valve housing and parts which are necessary to be held in proper alignment are so held. The arrangement is such, however, that certain parts are not necessarily held in axial alignment but still will operate perfectly. If, for example, the flange bolts 29 are not properly and evenly drawn there may be a slight misalignment between elements 22 and valve stem 18. This misalignment, however, will not prevent perfect seating of the valve since the head 19 has a slight play within the nut 20. The plug 25, however, insures that the plunger will be in perfect alignment with armature 27 and holds this armature from contact with the walls of the tube 31 and from the walls of the bore in the fill piece 28. The top portion of the coil housing 39 is bored out to receive the top of plug 45.

Metal to metal contact between the core of magnet 34 and the plunger tube 31 is prevented by the layer of asbestos 33 in a recessed portion of the outer portion of this tube. When the magnet coil is energized a flux is created which actuates the armature 27 and draws it up in contact with the stationary plunger 43. The valve stem 18 is raised from its seat to open communication between the ports 11 and 12. When the coil is deenergized the valve stem and the armature return to their original positions assisted by the spring 24 and the weight of the movable parts. The parts of the valve are easily accessible. Moreover the magnetic coil may be removed without breaking any of the gas sealed joints by simply removing the bolts 40 and lifting the coil housing from its seat.

It will be obvious to those skilled in the art that various changes may be made in my device without departing from the spirit of the invention and therefore I do not limit myself to what is shown in the drawing and described in the specification, but only as indicated in the appended claims.

Having thus fully described my said invention, what I claim as new and desire to secure by Letters Patent, is:

1. An electrically operated valve comprising a lower casing containing the valve elements and an upper casing containing the electrical elements, said valve elements comprising an inlet port and an exhaust port, a removable valve seat block between said ports, a valve stem, a valve stem guide carried by said removable valve seat block, a flexible joint in said valve stem, an armature secured to the upper end of said valve stem, a non-magnetic sleeve surrounding said armature and carried by said valve casing, a gas-tight joint between said sleeve and casing, a plug in the upper end of said sleeve, a stationary armature secured to said plug, a magnet carried by said upper casing and loosely surrounding said sleeve, said upper casing and magnet being adapted to be removed from said valve casing without disturbing said valve elements, substantially as set forth.

2. An electrically operated valve comprising a lower casing containing the valve elements and an upper casing containing the electrical elements, said valve elements comprising an inlet port and an outlet port, a removable valve seat block between said ports, a valve stem guide carried by said block, a valve stem mounted in said guide, a valve stem operating rod, a guide block for said rod, a loose connection between said operating rod and valve stem, a flange on said rod beneath said guide, a spring between said flange and said guide, an armature on the upper end of said rod, a sealed tube secured in said lower casing and housing said armature, a magnet in said upper casing, said magnet and upper casing being detachable from said lower casing, substantially as set forth.

3. An electrically operated valve comprising a lower casing containing the valve elements and an upper casing containing the electrical elements, said valve elements comprising an inlet port and an exhaust port, a valve seat block between said ports, a valve stem, a valve stem guide carried by said valve seat block, a flexible joint in said valve stem, an armature secured to the upper end of said valve stem, a non-magnetic sleeve surrounding said armature and carried by said valve casing, a gas-tight joint between said sleeve and casing, a plug in the upper end of said sleeve, a stationary armature secured to said plug, a magnet carried by said upper casing and loosely surrounding said sleeve, said upper casing and magnet being removable from said valve casing without disturbing said valve elements, substantially as set forth.

FRANCIS SHENTON.